T. MERRIAM.

Covering for Steam-Boilers.

No. 8,994. Reissued Dec. 9, 1879.

Witnesses:
C. G. Barnes.
Albert Cunningham

Inventor.
Truman Merriam
per A. S. Smith
Attorney

THE NORRIS PETERS CO., PHOTO-LITHO., WASHINGTON, D. C.

UNITED STATES PATENT OFFICE.

TRUMAN MERRIAM, OF MILWAUKEE, WISCONSIN.

IMPROVEMENT IN COVERINGS FOR STEAM-BOILERS.

Specification forming part of Letters Patent No. 156,711, dated November 10, 1874; Reissue No. 8,745, dated June 10, 1879; Reissue No. 8,994, dated December 9, 1879; application filed November 14, 1879.

*To all whom it may concern:*

Be it known that I, TRUMAN MERRIAM, of Milwaukee, Wisconsin, have invented certain new and useful Improvements in Coverings for Steam-Boilers or other bodies from which it is desirable to prevent the radiation of heat; and I do hereby declare the following to be a full, clear, and exact description of the same, reference being had to the accompanying drawings, making part of this specification, in which—

Figure 1:
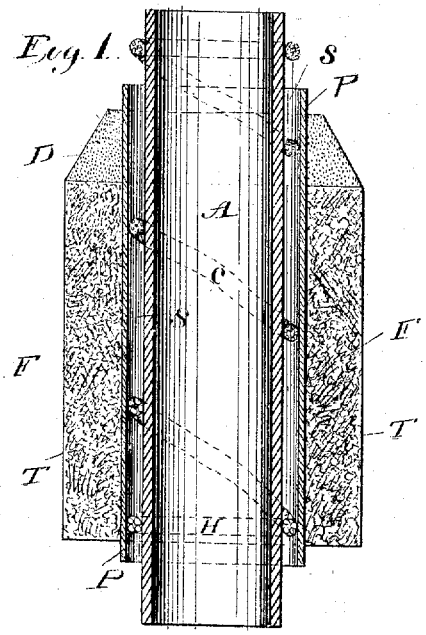
Figure 2:
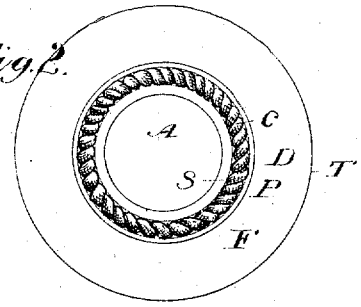

Figure 1 is a longitudinal sectional view, and Fig. 2 an end view, of a pipe, upon which, in this instance, I illustrate my invention.

A is a steam-pipe, about which I wind spirally a support, C. This may be of cord, and, if desired, may be covered with cement, which, after the cord has been destroyed by long subjection to extreme heat, will maintain its form and still support the covering P, which forms the exterior wall of a dead-air chamber, the pipe A forming the interior wall.

On the outside of the exterior wall, P, of the dead-air chamber I lay hair felt, F, or clay cement, as shown at D, and cover the whole with a compound (for which Letters Patent No. 156,710 were granted me November 10, 1874) marked T.

I am aware that a dead-air chamber has been used in covering steam-pipes previous to my invention, and that metal ribs running parallel to each other and the pipe have been used to support the exterior walls, and also that pointed lugs have been placed at intervals about the pipe for a support; but the former is objectionable, in that the dead-air chamber is not continuous about the pipe, the chamber being partitioned off into several smaller ones, and the ribs giving a great amount of contact for communicating heat from the pipe to the covering, and the latter in being difficult of adjustment and attachment, and serving for a support only at intervals.

In my device both the chamber and support are continuous. The support can be applied easily, and need only be secured at its ends.

What I claim as my invention, and desire to secure by Letters Patent, is—

1. The combination, with a steam pipe or boiler, of a covering and a spiral support, whereby a continuous dead-air chamber is produced, as and for the purpose set forth.

2. In combination with the pipe and covering P, a cord covered with cement, arranged about the pipe, substantially as described, to form a continuous dead-air chamber.

As evidence that I claim the above I have hereunto set my hand this 8th day of November, 1879.

TRUMAN MERRIAM.

Witnesses:
R. J. THOMAS,
S. S. STOUT.